April 19, 1955  W. F. HECKERMAN, JR  2,706,663
TRACK MOUNT FOR TRACTORS
Filed April 7, 1952  3 Sheets-Sheet 1
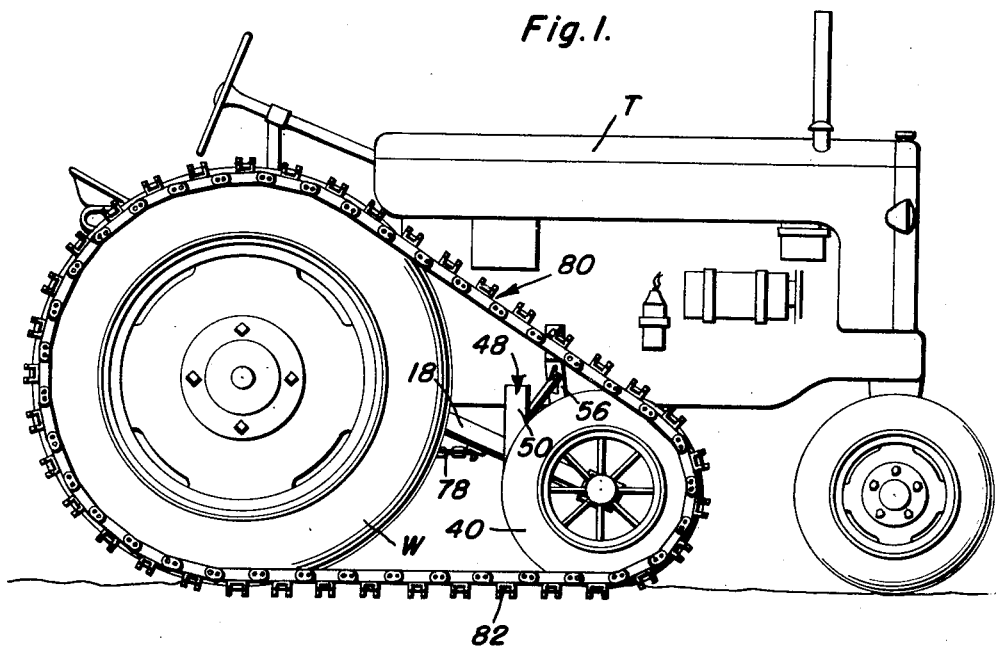
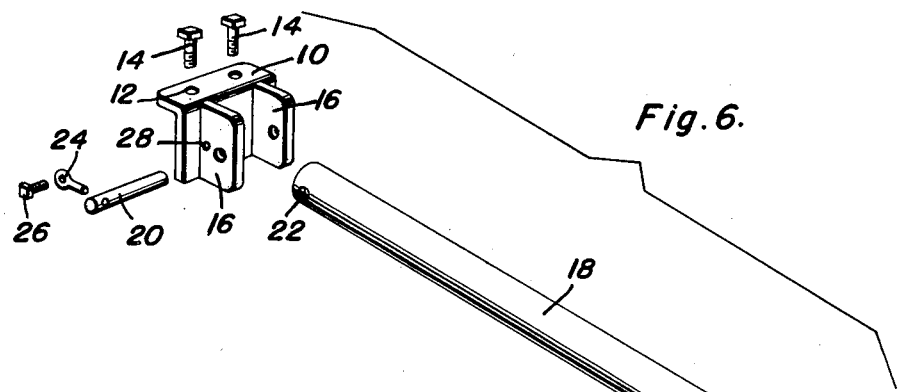
William F. Heckerman, Jr.
INVENTOR.
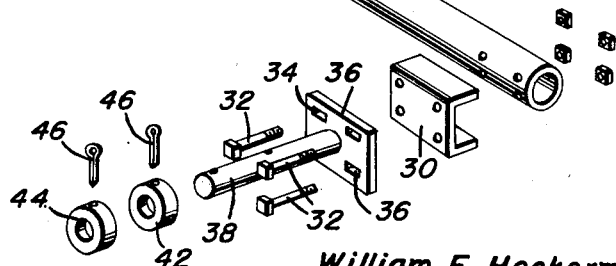

April 19, 1955   W. F. HECKERMAN, JR   2,706,663
TRACK MOUNT FOR TRACTORS

Filed April 7, 1952   3 Sheets-Sheet 2

William F. Heckerman, Jr
INVENTOR.

BY
Attorneys

April 19, 1955     W. F. HECKERMAN, JR     2,706,663
TRACK MOUNT FOR TRACTORS
Filed April 7, 1952     3 Sheets—Sheet 3
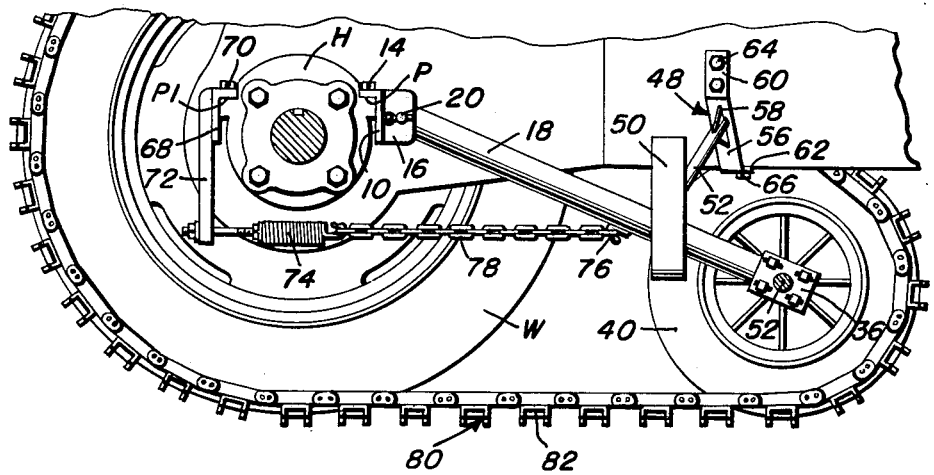
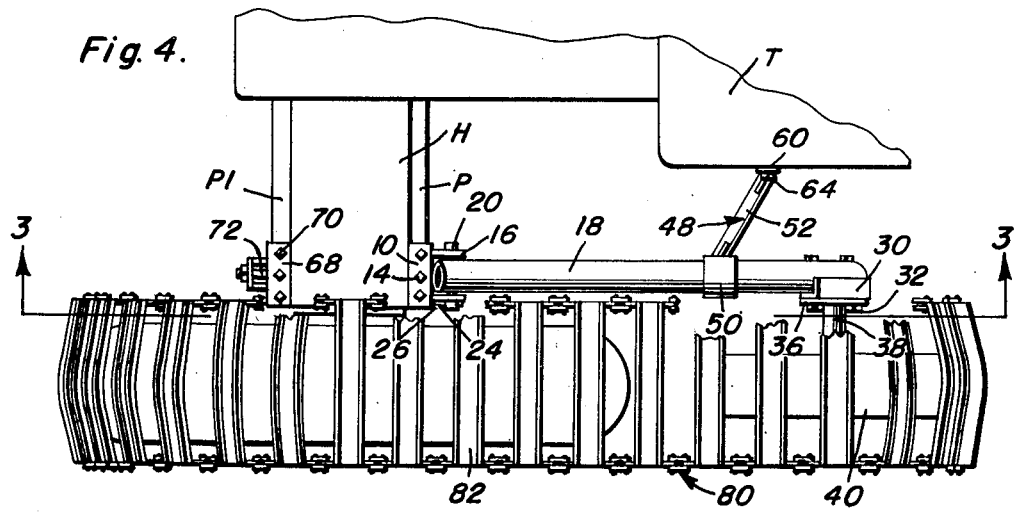
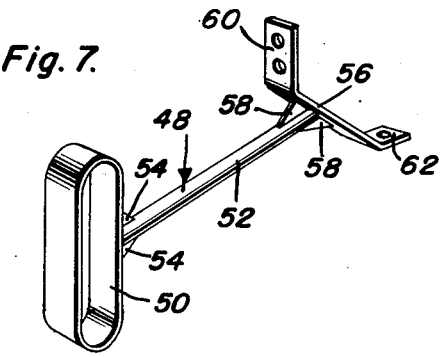
William F. Heckerman, Jr.
INVENTOR.

United States Patent Office 2,706,663
Patented Apr. 19, 1955

2,706,663

TRACK MOUNT FOR TRACTORS

William F. Heckerman, Jr., Jefferson City, Mo.

Application April 7, 1952, Serial No. 281,010

3 Claims. (Cl. 305—8)

This invention relates to new and useful improvements in tractor attachments and the primary object of the present invention is to provide a track and track mounting means for tractors to increase the traction at the rear end of a tractor and thereby increase its efficient use upon relatively soft ground.

Another important object of the present invention is to provide a track mount for tractors that is quickly and readily applied to or removed from a tractor in a convenient manner without interfering with any normal or standard parts of the tractor on which it is mounted.

A further object of the present invention is to provide a small and compact track mount for tractors involving idler wheel holding arms mounted on a tractor for vertical swinging movement and spring means attached to the arms to restrict and cushion upward movement of the wheels as the same move over ground or road irregularities.

A still further aim of the present invention is to provide a track mounting means for tractors that is extremely simple and practical in construction, strong and reliable in use, inexpensive to manufacture and maintain, and otherwise well adapted for the purposes for which the same is intended.

Other objects and advantages reside in the details of construction and operations as more fully hereinafter described and claimed, reference being had to the accompanying drawings forming part thereof, wherein like numerals refer to like parts throughout, and in which:

Figure 1 is a side elevational view of a tractor and showing the present invention installed thereon;

Figure 3 is a fragmentary vertical sectional view taken substantially on the plane of section line 3—3 of Figure 4;

Figure 4 is an enlarged fragmentary top plan view of Figure 1 and with parts broken away for the convenience of explanation;

Figure 6 is a group perspective view of one of the wheel holding arms and its attaching means; and, Figure 7 is a perspective view of one of the arm guides used in the invention.

Figure 2:
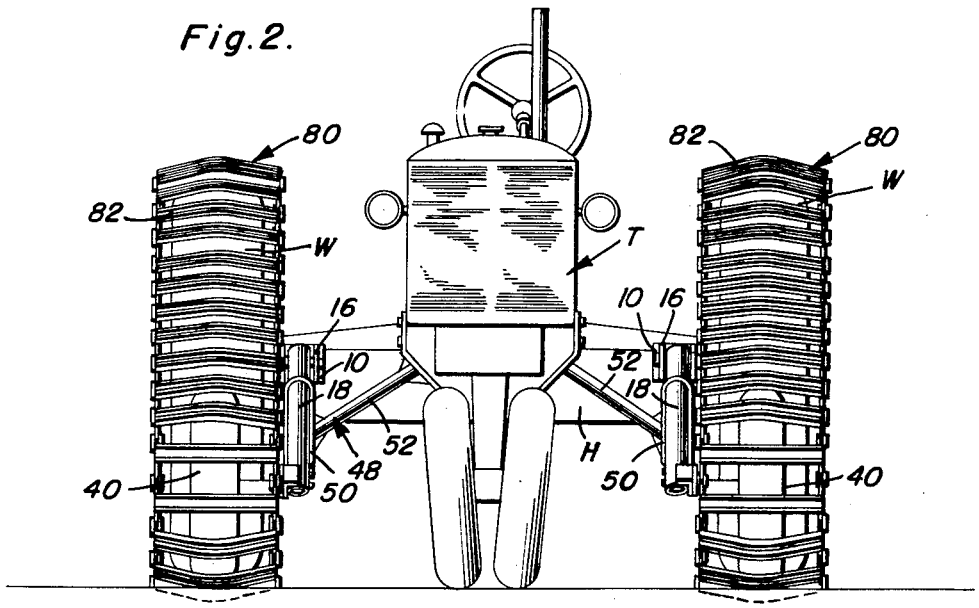
Figure 2 is a front elevational view of Figure 1.
Figure 5:
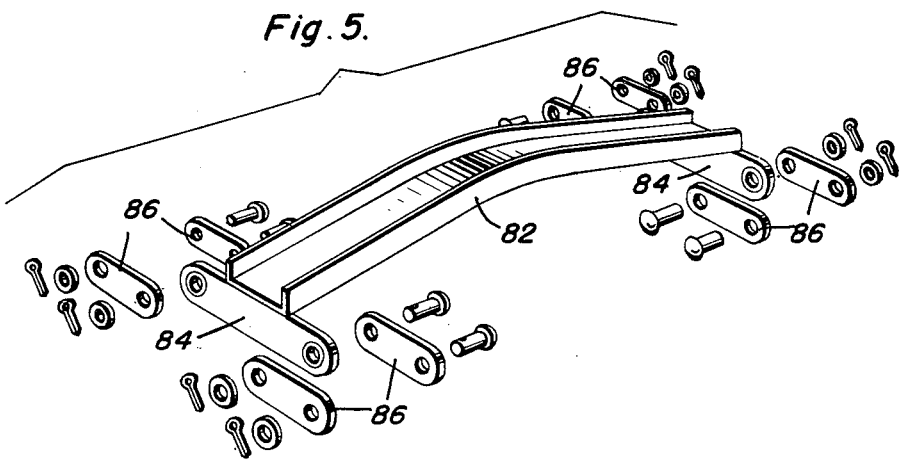
Figure 5 is a group perspective view of one of the cleat members used to form the traction members and also showing the means employed for pivotally connecting adjacent traction members together.

Referring now to the drawings in detail, wherein for the purpose of illustration, there is disclosed a preferred embodiment of the present invention, the numeral 10 represents a pair of angle brackets whose horizontal flanges are formed with apertures 12 that receive fasteners 14, whereby the angle brackets 10 may be removably secured over the forward shoulder portion P of a tractor's rear axle housing H.

A pair of spaced parallel vertical ears 16 are fixed to and project forwardly from the vertical flanges of the angle brackets 10 and receive therebetween the rear ends of tubular arms 18. Pivot pins 20 extend through the openings in the ears 16 and through transverse apertures 22 in the rear ends of the arms 18. Eye elements 24 fixed to and projecting laterally from the pins 20 receive bolts 26 that threadingly enter an aperture 28 in one ear of each pair of ears.

Channel shaped members 30 are removably secured to the forward ends of the arms 18 by fasteners (bolts and nuts) 32 and these fasteners pass through slots 34 in plates 36 to which stub axles 38 are fixedly secured. Idler wheels 40 are rotatably supported on the stub axles between collars 42 and 44 removably secured about the stub axles by cotter pins 46.

Guide means 48 is provided for the arms 18. The guide means comprises a pair of rigid loop elements 50 that are fixed to the outer ends of bars 52. Reinforcing webs 54 connect the outer ends of the bars 52 to the loop elements. The inner ends of the bars 52 are fixedly secured to the webs of channel shaped mounting brackets 56. Additional reinforcing webs 58 connect the inner ends of the bars 52 to the brackets 56.

The relatively perpendicular flanges 60 and 62 of the mounting brackets 56 are apertured to receive bolts 64 and 66, whereby the flanges 60 and 62 may be removably secured to relatively perpendicular side surfaces of a tractor T.

Rear angle iron anchoring brackets 68 are secured by fasteners 70 over the rear shouldered portion P1 of the tractor T and support depending hanger bars 72 whose lower ends are attached to coil springs 74. The forward ends of the coil springs 74 are attached to hooks 76 fixed to intermediate parts of the arms 18 by chains 78. The springs 74 restrict and cushion upward movement of the arms 18 and wheels 40.

Endless traction members 80 extend about the rear wheels W of the tractor and the idler wheels 40. Each traction member 80 is composed of a plurality of substantially V-shaped channel cleats 82 whose ends fixedly support transverse links 84. The ends of the links 84 are apertured and the ends of links 84 of one cleat are connected to the ends of an adjacent cleats' links by pairs of link elements 86.

Having described the invention, what is claimed as new is:

1. In a tractor having a rear axle housing and opposite side portions, a pair of mounting brackets secured to the axle housing adjacent the ends thereof, forwardly extending vertically swingable wheel holding arms having their rear ends pivotally attached to the brackets for vertical swinging movement, guide means attached to the side portions of the tractor slidably receiving the arms, said guide means including a pair of rigid loop elements surrounding said arms, channel shaped brackets removably secured to the side portions of the tractor, and rigid bars terminally attached to the channel brackets and the loop elements, idler wheels carried by the forward ends of said arms and spaced in front of the rear wheels of the tractor, spring means connecting intermediate portions of the arms to the axle housing and restricting upward movement of the arms, and endless traction members engaged about the rear wheels of the tractor and the idler wheels, said guide means also constituting stops limiting swinging movement of said arms to prevent said idler wheels from contacting said rear wheels.

2. A track mounting means for tractors comprising a pair of vertically swingable arms having rear ends adapted to be pivotally attached to the rear axle housing of a tractor, idler wheels carried by the forward ends of said arms, spring means attached to the arms and adapted to be attached to a portion of a tractor to restrict and cushion upward movement of the idler wheels, and guide means slidably receiving the arms and having means for anchoring the same on the sides of a tractor, said guide means comprising a pair of rigid loop elements surrounding said arms and limiting the vertical swinging movement thereof, channel shaped mounting brackets adapted to be removably secured to the sides of a tractor and rigid bars terminally fixed to the loop elements and the brackets.

3. In an auxiliary wheel mount for tractors including a vertically swingable arm and an idler wheel attached to one end of the arm, the improvement of which comprises a rigid guide loop slidably guidingly surrounding said arm for limiting and guiding the movement of said arm, a channel-shaped mounting bracket adapted to be removably secured to the side of a tractor and a rigid bar terminally fixed to the loop and the bracket to space the loop from one side of a tractor.

References Cited in the file of this patent

UNITED STATES PATENTS

| | | |
|---|---|---|
| 482,599 | Townsend | Sept. 13, 1892 |
| 1,354,219 | Seltenright | Sept. 28, 1920 |
| 1,659,297 | Langenfeld | Feb. 14, 1928 |
| 2,587,813 | Bombardier | Mar. 4, 1952 |